Feb. 16, 1932.　　　R. P. BROWN　　　1,845,699
BINDING POST FOR METERS
Filed Nov. 9, 1927

INVENTOR
Richard P. Brown
BY
John E. Hubbell
ATTORNEY

Patented Feb. 16, 1932

1,845,699

UNITED STATES PATENT OFFICE

RICHARD P. BROWN, OF PHILADELPHIA, PENNSYLVANIA, ASSIGNOR TO THE BROWN INSTRUMENT COMPANY, OF PHILADELPHIA, PENNSYLVANIA, A CORPORATION

BINDING POST FOR METERS

Application filed November 9, 1927. Serial No. 232,042.

The general object of the present invention is to provide improved means for connecting the terminal of an electric meter to a circuit conductor external to the meter casing. More specifically, the object of the invention is to provide simple and effective means for so connecting a thermocouple lead or circuit conductor to a meter terminal by a binding post secured to the meter casing, as to insure equality of temperature between the portions of the binding post to which said terminal and lead are respectively connected. By this procedure if said terminal and lead are of the same metal, local thermoelectric action at the binding post is avoided.

The various features of novelty which characterize my invention are pointed out with particularity in the claims annexed to and forming a part of this specification. For a better understanding of the invention, however, and the advantages possessed by it reference should be had to the accompanying drawing and descriptive matter in which I have illustrated and described a preferred embodiment of the invention.

Of the drawings:—

Figure 1:
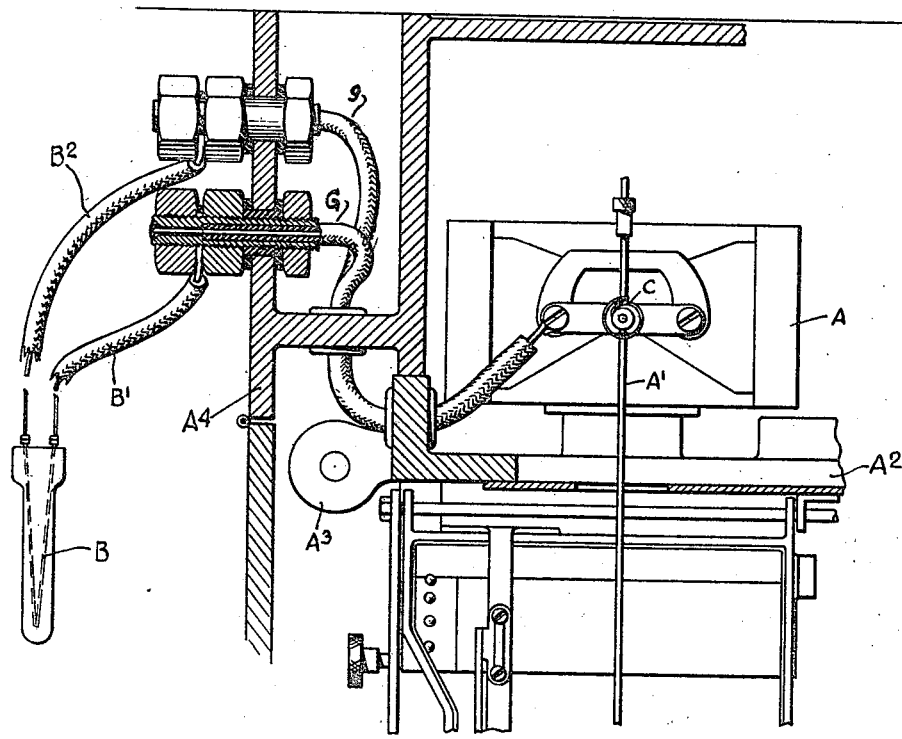
Figure 2:
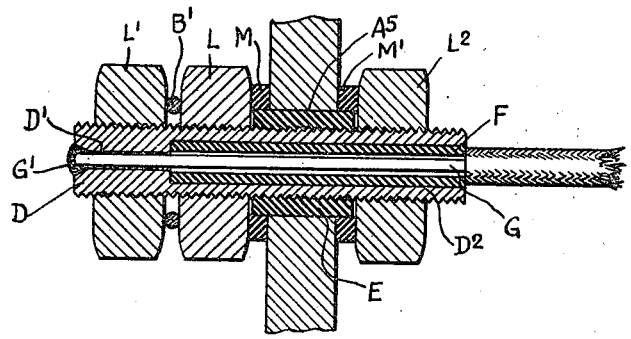

Fig. 1 is a plan view partly in section of a recording meter provided with my invention; and Fig. 2 is an enlarged view of one of the binding posts illustrated in Fig. 1.

In the drawing I have illustrated an electric measuring instrument of well known type comprising a galvanometer A having a movable indicating element A' and a casing A⁴ enclosing the instrument. As shown, the meter is suitably supported on a door A² having lugs A³ pivotally connected to the body portion of the meter casing A⁴ as in my prior Patent No. 1,564,519. In accordance with the present invention the meter terminal conductors G and $g$ are connected to external meter energizing circiut conductors B' and B² respectively, each by a corresponding binding post D of special construction.

In the preferred construction illustrated each binding post comprises a hollow externally threaded body in and extending through an opening A⁵ in the outer wall of the meter casing and clamped to the latter by clamping nuts L and L². An insulation bushing E and washers M and M' insulate each post from the meter casing when the latter is made of metal. The bore or axial passage D' in each binding body at the outer end thereof is only large enough to readily receive the end of the corresponding meter terminal conductor G or $g$ which is secured to the outer end of the binding post as by solder G'. The axial passage has a portion D² extending to the inner end of the binding post which is enlarged to receive an insulation sleeve F surrounding the corresponding portion of the corresponding meter terminal conductor. The body portion of said conductor may have an ordinary insulation jacket but preferably the sleeves F form a part of the binding post rather than of the conductor. Each of the circuit conductors B' and B² is secured to the outer end of the corresponding binding post as by clamping it between the nut L and a second clamping nut L'.

When the leads B' and B² connect a thermocouple B to the meter terminal conductors G and $g$, the leads B' and B² and also the meter terminal conductors are made of suitable extension lead material so that the cold junction of the thermocouple is transferred to the meter provided that there is no temperature difference between the connected ends of the lead B' and terminal G or between the connected ends of the lead B² and terminal $g$. With the construction described no such temperature difference will exist even though the temperature within the meter casing may be different from that outside the meter. The cold junction of the thermocouple is thus brought to the instrument where it may be easily and accurately compensated by suitable compensating means, such as a Briguet spiral C arranged to adjust the meter pointer A' relative to the meter scale as described for example in my Patent 1,639,365, granted August 16, 1927. The present invention thus provides an effective and easily assembled and dissembled binding post, which eliminates errors heretofore experienced when meter terminals within a meter casing have been connected by binding posts of usual construction to the so called extension leads of a thermocouple.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:—

1. The combination with an electrical measuring instrument having a galvanometer element and an enclosing casing, of a source of electric energy, a metallic binding post secured to said casing, a conductor connecting said source to said binding post, and a second conductor connecting said galvanometer element to said binding post at a point having a temperature the same as that at said first conductor connection, said conductors being formed of material having the same thermoelectric properties, whereby said course is connected to said galvanometer element without the formation of an effective thermoelectric junction in said connection.

2. The combination with an electrical measuring instrument having a galvanometer element and an enclosing casing, of a thermocouple, a metallic binding post secured to said casing, an extension lead connecting one of the elements of said thermocouple to said binding post, and a conductor extending from said galvanometer element through said casing and connected to said binding post at a point subject to the same temperature as said extension lead connection, said conductor being formed of material having the same thermoelectric properties as said extension lead, whereby said thermocouple element is connected to said galvanometer element without the formation of an effective thermoelectric junction in said connection.

3. The combination with an electrical meter having an enclosing casing, of a thermocouple, a metallic binding post mounted on and extending through said casing, an axial passage extending from the inner end of said binding post towards its outer end, an extension lead connecting one of the elements of said thermocouple to the outer end of said binding post, and a conductor extending from said meter into said binding post passage and connected to the outer end thereof at a point adjacent said extension lead connection, said conductor being formed of material having the same thermoelectric properties as said extension lead, whereby said thermocouple element is connected to said meter without the formation of an effective thermoelectric junction in said connection.

4. The combination with an electrical meter having an enclosing casing, of a thermocouple, metallic binding posts secured to said casing, extension leads connecting the elements of said thermocouple to corresponding ends of said binding posts, and conductors connecting said meter to said binding posts at the same end as said extension lead connections, each of said conductors being formed of material having the same thermoelectric properties as the corresponding extension lead, whereby said thermocouple is extended to said meter without the formation of effective thermoelectric junctions in said connections.

5. The combination with an electrical meter having an enclosing casing, of a thermocouple, metallic binding posts secured to said casing, extension leads connecting the elements of said thermocouple to the outer ends of said binding posts, and conductors connecting said meter to the outer ends of said binding posts adjacent said extension lead connections, each of said conductors being formed of material having the same thermoelectric properties as the corresponding extension lead, whereby said thermocouple is extended to said meter without the formation of effective thermoelectric junctions in said connections.

6. The combination with an electrical meter having an enclosing casing, of a thermocouple, tubular metallic binding posts secured to said casing, extension leads connecting the elements of said thermocouple to the outer ends of said binding posts, and conductors extending from said meter through said binding posts and connected to the outer end thereof adjacent said extension lead connections, each of said conductors being formed of material having the same thermoelectric properties as the corresponding extension lead, whereby said thermocouple is extended to said meter without the formation of effective thermoelectric junctions in said connections.

Signed at Philadelphia, in the county of Philadelphia and State of Pennsylvania, this fifth day of November, A. D. 1927.

RICHARD P. BROWN.